United States Patent [19]

Winchell et al.

[11] 4,437,535

[45] Mar. 20, 1984

[54] THREE-TRACK MOTORCYCLE WITH CAMBERING MAIN FRAME

[75] Inventors: Frank J. Winchell, Orange Lake; Klaus O. Winkelmann, Troy, both of Mich.

[73] Assignee: General Motors Corporation, Detroit, Mich.

[21] Appl. No.: 402,220

[22] Filed: Jul. 26, 1982

Related U.S. Application Data

[63] Continuation of Ser. No. 182,751, Aug. 29, 1980, abandoned.

[51] Int. Cl.³ .............................................. B62D 61/08
[52] U.S. Cl. .................................. 180/215; 180/210; 280/112 A; 280/266
[58] Field of Search ............... 180/215, 210, 211, 212, 180/213, 214, 216; 280/111, 112 A, 62, 266, 282, 220

[56] References Cited

U.S. PATENT DOCUMENTS

| | | | |
|---|---|---|---|
| 3,277,840 | 10/1966 | Yao-Tzu-Li | 105/145 |
| 3,605,929 | 7/1969 | Rolland | 280/111 X |
| 3,781,031 | 12/1973 | Patin | 280/62 |
| 3,938,609 | 2/1976 | Kensaku et al. | 180/210 |
| 4,020,914 | 5/1977 | Trautwein | 180/210 |
| 4,087,107 | 5/1978 | Winchell | 280/220 |
| 4,088,199 | 5/1978 | Trautwein | 280/112 A X |
| 4,325,565 | 4/1982 | Winchell | 280/282 |

FOREIGN PATENT DOCUMENTS

| | | | |
|---|---|---|---|
| 929051 | 1/1955 | Fed. Rep. of Germany | 180/215 |
| 2014094 | 8/1979 | United Kingdom | 180/210 |

*Primary Examiner*—Joseph F. Peters, Jr.
*Assistant Examiner*—Mitchell J. Hill
*Attorney, Agent, or Firm*—Charles R. White

[57] ABSTRACT

Three-wheel motorcycle with cambering main frame supporting a front steering column and front wheel. The cambering frame is pivotally mounted on a centralized non-cambering rear support including the engine that carries the rear suspension and laterally spaced drive wheels. Operator footrests are mounted on rear support and automatically tilt with the cambering frame to improve operator balance of the vehicle.

7 Claims, 8 Drawing Figures

THREE-TRACK MOTORCYCLE WITH CAMBERING MAIN FRAME

This is a continuation of application Ser. No. 182,751 filed Aug. 29, 1980, now abandoned.

This invention relates to narrow-track, high-stability vehicles and more particularly to a new and improved three-wheel cambering motorcycle having a rear frame and engine assembly providing a fixed rear support for drive wheels and for a cambering main frame that in turn supports the operator, forward steering column and front wheel.

In U.S. Pat. No. 4,325,565 issued Apr. 20, 1982 for Cambering Vehicles, a narrow-track, three-wheel cambering vehicle is disclosed as having a centralized cambering frame to which is fixed a steering column and a dirigible engine-driven wheel at the front of the vehicle and an operator support seat at the rear thereof. A stabilized shell or platform, supported immediately above the ground by laterally spaced rear wheels, receives the feet of the operator and rockably supports the cambering frame. With this vehicular construction, the operator, while sitting or standing, can impart natural balancing moments to the cambering frame and steering column of the vehicle through his feet using the stabilized platform as a moving ground. The operator may, accordingly, maintain vehicle balance while the vehicle is stationary or when cornering through a wide range of vehicle speeds with the cambering frame leaned and balanced as the turns are executed. In the vehicle disclosed in the prior application, the steering column supports this engine and the front wheel is engine driven while the platform is disposed over a rearwardly extending portion of the cambering frame in turn disposed immediately above the support surface. While the disclosed vehicle performed as intended, it was not particularly suitable for a three-wheel motorcycle configuration with rear wheel drive.

To this end, the present invention is drawn to a three-track motorcycle in which a rear frame and engine are uniquely arranged and coupled together into an assembly to form a rear carriage for the rear drive wheels suspended thereto through spring and shock absorber units. Mounted for left and right leaning movement to either side of the longitudinal axis of the vehicle and the rear carriage is a main cambering frame which supports the vehicle operator and optionally a passenger above the engine and drive wheels. The main cambering frame extends forwardly from the axial pivot connections with the rear carriage to a steering head that pivotally carries a steering column assembly with the dirigible front wheel. The cambering frame carries a seat for the operator while the rear carriage carries laterally spaced footrests disposed on opposite sides of the cambering frame. With this construction an operator can sit upon the cambering main frame and have his left and right feet on the laterally spaced foot rests and impress instinctive balancing moments to the cambering frame to improve stability during cornering and for balancing when the vehicle is stationary. With this invention, vehicle balancing can be accomplished with reduced effort since the engine is supported in fixed relationship with respect to the cambering frame. Also, there is improved traction since the operator, seated above the engine and drive wheels, can readily shift his body weight with respect to the drive wheels.

It is a feature, object and advantage of this invention to provide a new and improved cambering three-track vehicle with a centralized cambering frame supporting a seated operator and a steerable front wheel and with a fixed rear frame and engine providing a platform or carriage supporting rear drive wheels and the cambering frame; the platform further forms a moving ground for receiving the laterally spaced feet of the operator so that the operator can directly impart natural balancing moments to the cambering frame for stabilized cornering and to hold the vehicle in a balanced upright position when stationary.

Another feature, object and advantage of this invention is to provide a new and improved narrow-track, three-wheel vehicle having an upper cambering main frame operatively supporting the vehicle operator and a steerable front wheel and having a lower rear platform on which laterally spaced rear wheels are mounted that generally remain in a plane generally fixed with respect to the ground during vehicle maneuver.

Another feature, object and advantage of this invention is to provide a new and improved three-wheel cambering vehicle having a pair of laterally spaced rear drive wheels suspended from a rear platform provided by a rear frame and engine and further having a dirigible front wheel disposed on a steering column of a cambering main frame; a vehicle operator seated on the cambering frame can impress manual balancing moments using the rear platform as a ground for improved vehicle stability during cornering and when stationary.

These and other features, objects and advantages of this invention will be more apparent from the following detailed description and drawing in which.

Figure 1:
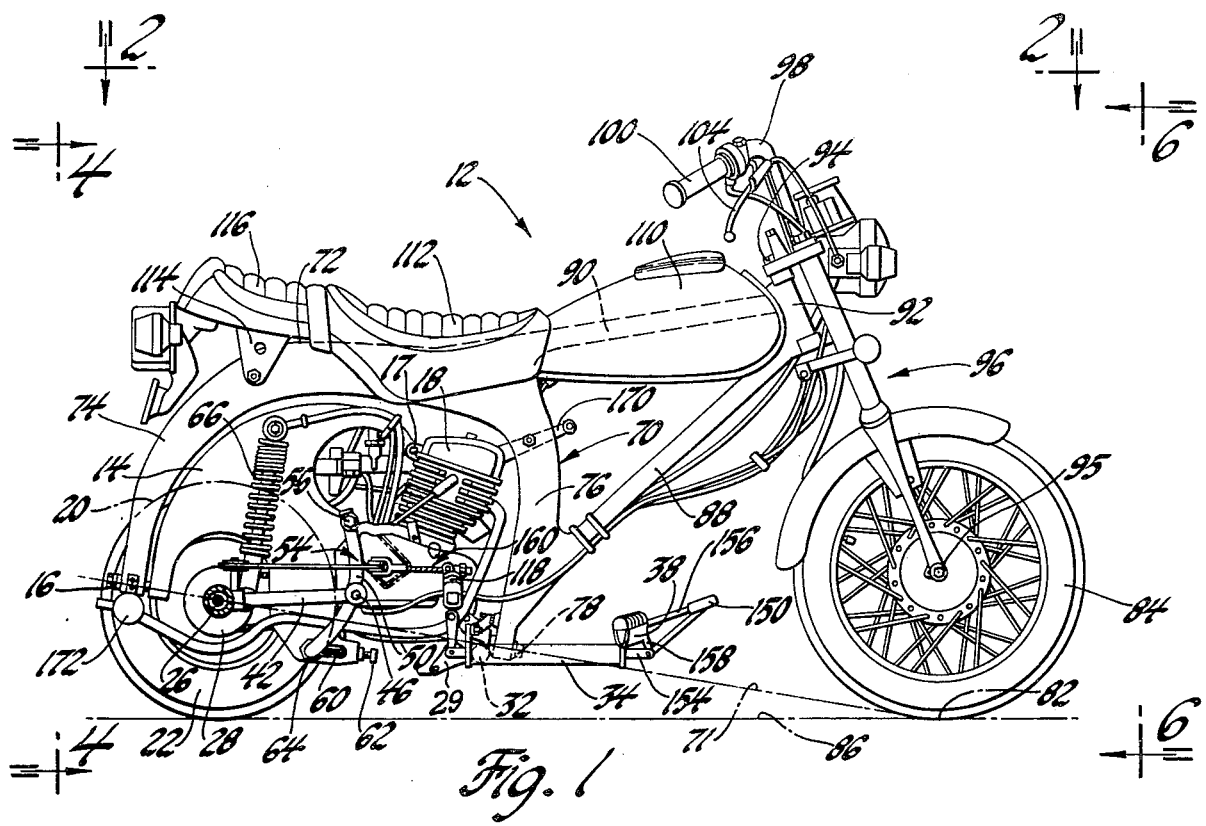
FIG. 1 is a side elevational view with parts removed of a three-wheel cambering motorcycle according to this invention.
Figure 2:
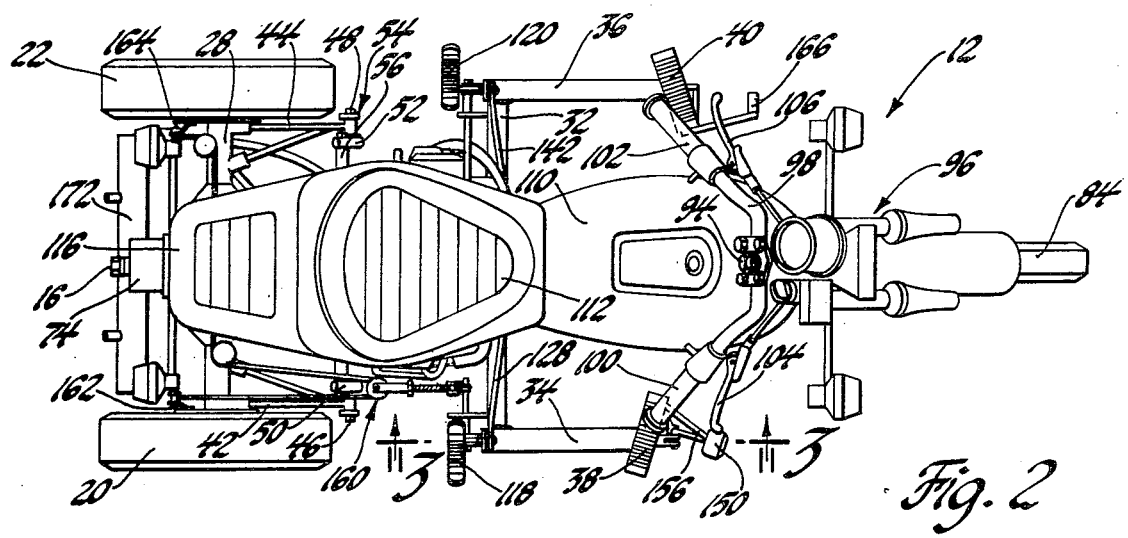
FIG. 2 is a top plan view of the vehicle of FIG. 1 taken along lines 2—2 of FIG. 1.

Turning now in greater detail in the drawing, there is shown a three-wheel motorcycle 12 providing a narrow-track, highly maneuverable and stable vehicle for an operator and an optional passenger seated in tandem. This vehicle has a longitudinally oriented and fixed rear frame 14 that arches upwardly from a centralized and inclined rear pin 16 into connection, through threaded fastener 17, to an upper portion of an internal combustion engine 18. With the rear frame and engine integrally coupled to one another, a rear carriage or support platform of this vehicle is formed. In addition to forming a structural part of the vehicle, the engine drives laterally spaced rear wheels 20, 22 through a chain 24, a differential not shown, and laterally extending axle shafts 26. The differential and axle shafts are operatively mounted in a stepped cylindrical housing 28 which extends laterally and with clearance through the arch of the rear frame 14 and which rotatably mounts the laterally spaced rear drive wheels 20, 22 at the outboard ends thereof. Rigidly attached to the front of the engine 29 is a laterally extending cross tube 32, the outboard ends of which are connected to left and right forwardly extending outrigger tubes 34 and 36 that respectively operatively support operator footrests 38 and 40.

The differential and axle housing 28 is secured to the rearward end of a pair of swing suspension arms 42 and 44 laterally disposed from one another and respectively located inboard of the rear wheels 20, 22. The forward ends of these suspension arms are mounted for independent swinging movement on laterally extending pins 46 and 48. These pins are supported in an intermediate position on arms 50 and 52 of a chain adjustment bracket assembly 54. The upper ends of arms 50, 52 are pivoted to the rear frame 14 by pivot shaft 56 which extends laterally through the rear frame. The lower ends of arms 50, 52 are connected by a cross arm which extends through an adjustment slot 60. Adjustment screw 62 threadedly mounted in the rear frame 14 is operatively connected to the cross arm of the bracket assembly so that arms 50, 52 can be precisely turned with respect to pivot shaft 56 to move the differential and axle housing forwardly or rearwardly to thereby adjust the tension on the drive chain 24. Locking nuts 64 threadedly mounted on the lower ends of arms 50, 52 are employed to maintain these arms in a selected position.

Laterally spaced suspension spring and shock absrober units 66 and 68 operatively interconnect the rear frame 14 and the differential and axle housing 28 to form the hydraulically damped spring suspension between the drive wheels 20, 22 and the rear support platform to provide for a smooth vehicle ride and good handling characteristics.

This invention features a centralized and longitudinally extending cambering frame 70 which is mounted for left and right cambering motions or roll with respect to the roll axis 71 of the vehicle and to the rear frame and engine. The cambering frame has an inverted U-shaped back portion 72 which arches over the rear frame 14. The rear leg 74 of this back portion is rockably supported on rear pin 16 while the forward leg 76 thereof is rockably supported on a centralized forward pin 78 projecting from cross tube 32 and associated bracket 29 which has inclined alignment with the pivot pin 16 so that the roll axis 71 of the cambering frame intersects the center of the patch or foot print 82 which the dirigible forward wheel 84 imprints on support surface 86.

The cambering frame 70 has a lower front support tube 88 generally inclined upwardly from pin 78 and has a top support tube 90 extending forwardly from an upper portion of the forward leg 76 of the frame. These tubes intersect in a steering head 92 set at a predetermined and rearwardly inclined rake angle for the support of a steering pin 94.

A conventional dual bar front fork or steering assembly 96 is pivotally mounted on steering pin 94 for steering movements with respect to the front steering axis. The lower end of the steering assembly 96 rotatably mounts the front wheel 84 on axle 95. The upper end of the steering column assembly is operatively connected to handlebars 98 on which handgrips 100 and 102 are operatively mounted. The handgrip 100 is conventionally connected through a cable to the throttle valve of the engine. By manually turning this grip to selected positions, throttle valve opening is accordingly set for control of engine speeds. Manual lever 104 mounted on the handlebars adjacent the grip 100 is operatively connected to the front brakes and is manually actuated by the vehicle operator when braking is desired. Hand lever 106 mounted on the handlebars adjacent the grip 102 is operatively connected to the engine clutch and is manually actuated for clutch control when shifting gears.

Figure 3:
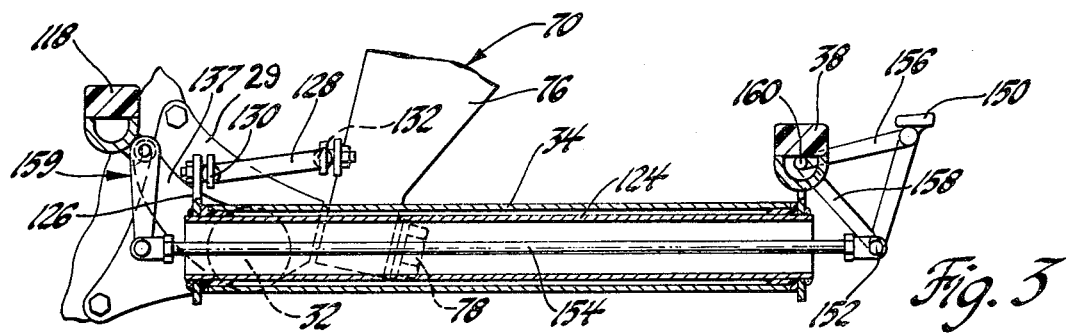
FIG. 3 is a cross-sectional view of control components of the vehicle of this invention taken generally along lines 3—3 of FIG. 1.
Figure 4:
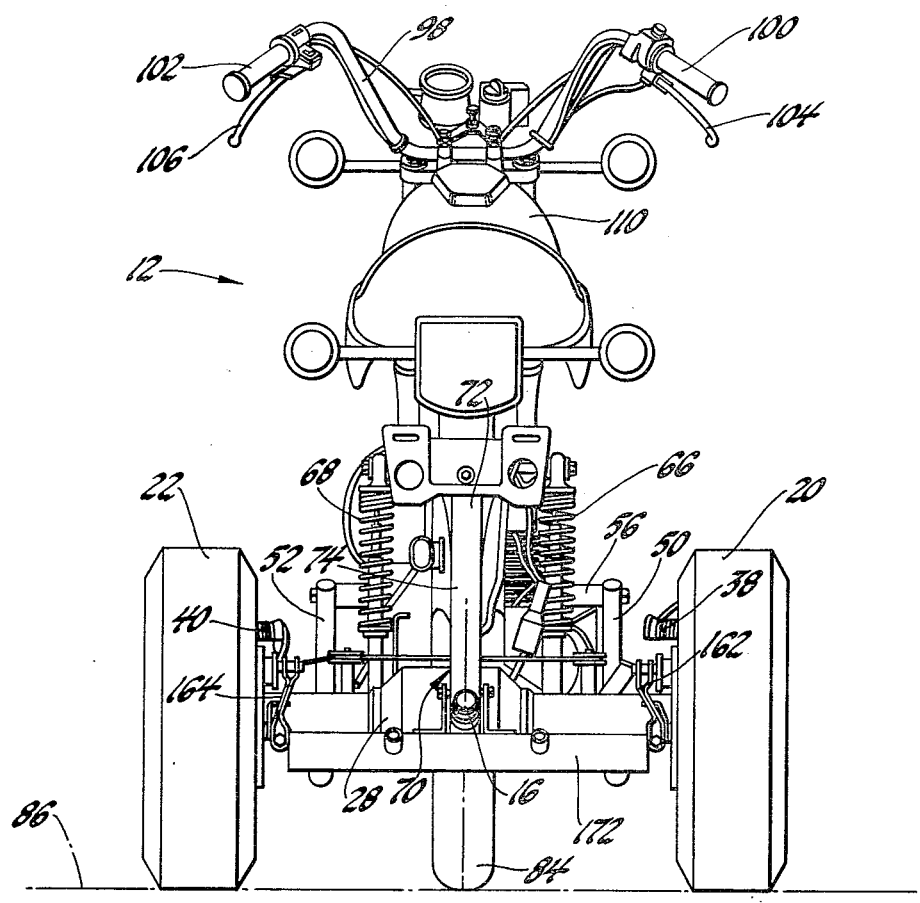
FIG. 4 is a rear view of the vehicle of this invention taken along lines 4—4 of FIG. 1.
Figure 5:
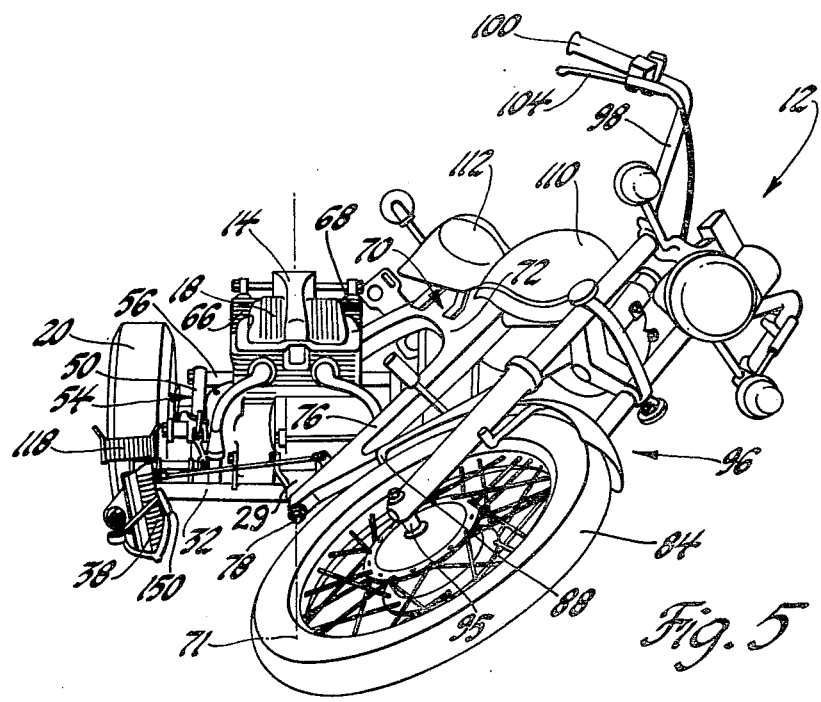
FIG. 5 is a front perspective view of the vehicle of FIG. 1 showing the cambering of the main frame of this invention.
Figure 6:
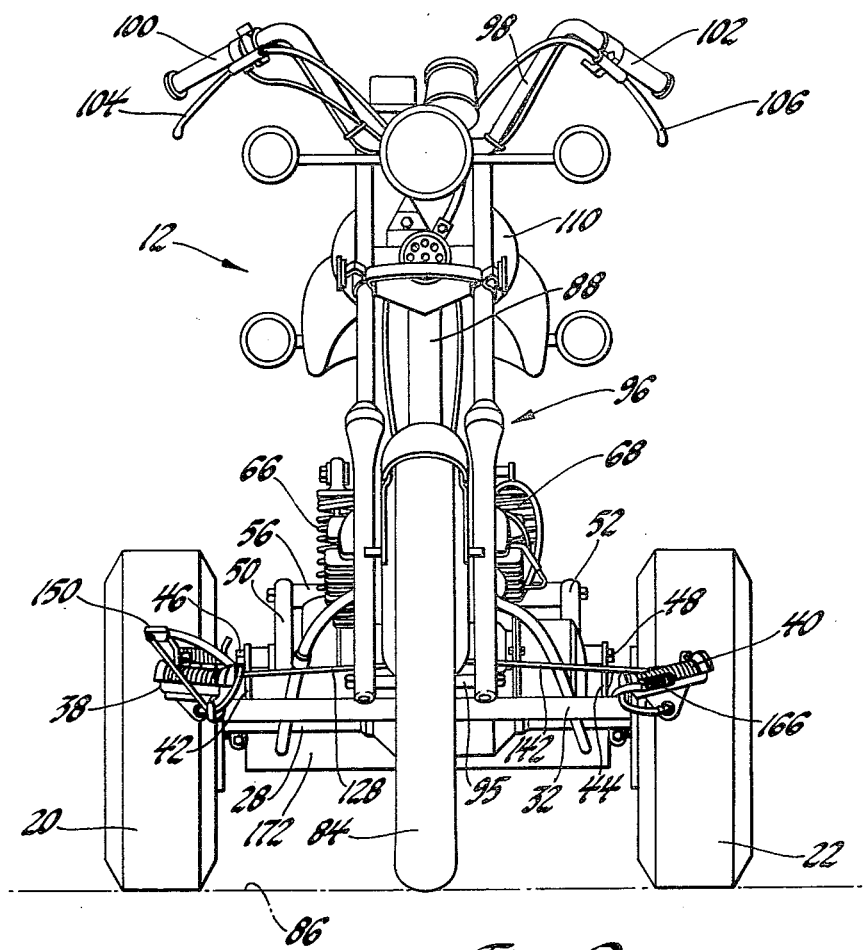
FIG. 6 is a front view of the vehicle of this invention taken along lines 6—6 of FIG. 1.
Figure 7:
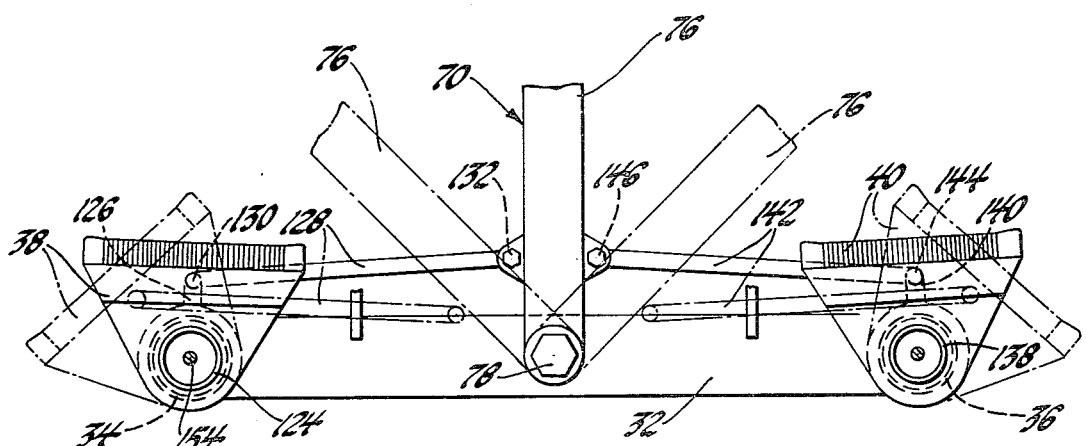
FIG. 7 is a diagrammatic illustration of the cambering footrest of the vehicle of this invention.
Figure 8:
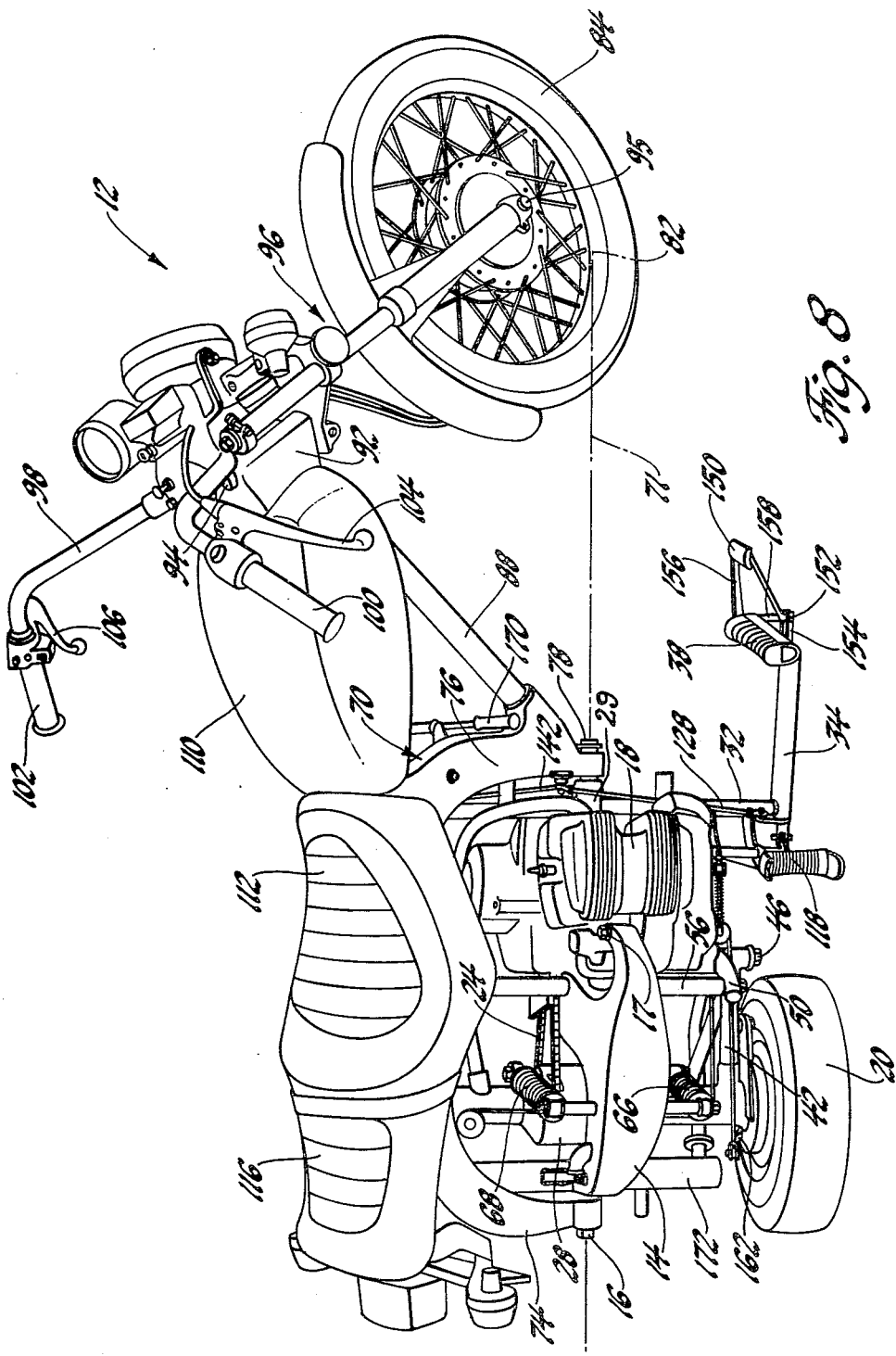
FIG. 8 is a top perspective view of the vehicle of FIG. 1 illustrating the cambering of the main frame.

The handlebar mounted controls are conventional and can be readily actuated by a vehicle operator seated immediately behind fuel tank 110 on forward seat 112 of a seat assembly fixed by brackets 114 and other fastener provision, not shown, to the back portion of the cambering frame. The seat assembly includes a passenger seat 116 immediately behind the operator seat 112. The feet of a passenger seated on seat 116 rests on pegs 118 and 120 respectfully secured to the rear ends of outrigger tubes 34 and 36 by fixed brackets 137. The feet of the operator respectively engage footrests 38 and 40 as previously stated. Instead of being fixed as with the passenger's foot pegs, the operator's footrest 38 and 40 rotate with respect to the axis of corresponding outrigger tubes 34 and 36 in response to the cambering of frame 70. To this end FIGS. 3 and 7 best illustrate the rolling or cambering of the operator footrests. Footrest 38 is attached to the forward end of an inner tube 124 which is rotatably mounted by suitable bearings in outrigger tube 34. The back end of the inner tube has a lever arm 126 fixed thereto which is connected through link 128 and spherical pivot joints 130 and 132 to the forward leg 76 of the cambering frame 70. In the same manner, footrest 40 is connected to the leg 76 by tube 138 rotatable within outrigger tube 36, lever arm 140, link 142, and pivots 144 and 146. With such construction, the footrests 38 and 40 camber with the main cambering frame as diagrammatically illustrated by FIG. 7 so that the operator's feet maintain a fixed position with respect to his body when the operator cambers the frame 70 and his body is executing corners. This ensures that the operator can efficiently and effectively impart instinctive balancing load to the footrest when cambering without any appreciable foot slippage to thereby provide improved cambering control.

Immediately forward of footrest 38 is a rear brake pedal 150 having a lower end connected by pivot 152 to an axially movable actuator rod 154 centrally mounted through tube 124. Support arms 156 and 158 operatively connect the pedal 150 for pivotal movement with respect to support pivot 160, coaxial with footrest 38, when pedal 150 is depressed by the vehicle operator. The back end of the actuator rod 154 is pivotally connected to a lever system 159 that in turn is connected by pulley and cable system 160 to the rear brakes of the vehicle. By depressing the pedal 150, the rod pulley and cable system will be actuated to turn the brake arms 162, 164 so that shoe brakes in the drums of the rear wheels will be actuated for rear wheel braking. A gear shift pedal 166 is mounted on the outrigger tube 36 in a similar manner to that of the rear brake pedal for manual operation of a conventional transmission gear shift mechanism not shown. Lever 170 is a camber lock which in the position shown in FIG. 1 engages a recess in the engine for locking the vehicle in the standing position. When cambering, this camber lock will be moved to permit the cambering frame to be cambered as indicated above. A cylindrical engine muffler and exhaust 172 is operatively mounted at the rear of the vehicle as shown.

With this invention, a vehicle operator can be steated upon the vehicle when stationary and impress instinctive balancing loads to the footrests 38 and 40 so that the vehicle is maintained in an upright position without the feet touching the vehicle supporting surface. When the vehicle is being driven, cornering and other cambering maneuvers can be readily accomplished with the operator imparting balancing loads to the footrests 38 and 40 which tilt in direction and degree corresponding to degree of camber. This balancing is through the feet and legs of the operator and is a natural reaction which does not require any auxiliary balancing mechanism. Thus, if the operator is executing a sharp right turn, the operator can readily camber the cambering frame as the rear carriage of the vehicle remains in fixed angular relationship to the supporting ground. The cambering frame when leaned to the right side of the cambering axis can be balanced by loads impressed to the tilted footrests 38. In a similar manner, stabilized cambered left cornering can be accomplished. With the operator seated on the cambering frame immediately above the fixed frame and engine, traction is improved and vehicle maneuvers are effective for cornering at wide speed ranges and through narrow roadways. Furthermore, with this invention, the cambering and fixed frame arrangement provides for improved access to the suspension components as well as the engine.

While a preferred embodiment has been shown and described to illustrate the invention, other embodiments will become apparent to those skilled in the art. Accordingly, the scope of this invention is set forth in the following claims.

The embodiments of the invention in which an exclusive property or privilege is claimed are defined as follows:

1. A three-wheel cambering vehicle comprising a front steering fork assembly rotatable about an inclined steering axis, a steerable front road wheel mounted on the lower extremity of said fork assembly for rotation about an axis transverse to said steering axis, manual steering means fixed to an upper portion of said fork assembly, a cambering main frame having a forward support mounting said steering fork assembly for pivotal movement about said steering axis, a rear carriage, forward and rearward pivots pivotally supporting said cambering main frame for left and right cambering movement with respect to said rear carriage about a centralized roll axis, a pair of laterally spaced road wheels operatively supporting said rear carriage, vehicle engine means for driving said rear wheels and rigidly secured to and extending forwardly from said rear carriage to form a forward portion thereof, said forward pivot supported by and extending forwardly of said engine means, said cambering frame having a forward portion pivotally mounted on said forward pivot, said cambering frame extending upwardly and rearwardly from said forward pivot over said engine and rear carriage into connection with said rearward pivot, a seat on said cambering main frame for supporting a vehicle operator and laterally spaced footrest means secured to said rear carriage for receiving the feet of said operator when seated on said seat to permit said operator to directly use said engine means and rear carriage as a ground and instinctively balance said main frame when cambered.

2. A three-wheel cambering vehicle comprising a front steering fork assembly movable about a steering axis extending upwardly from the surface supporting said vehicle, a steerable front road wheel mounted on the lower extremity of said fork assembly for rotation about an axis transverse to said steering axis, manual steering means fixed to an upper portion of said fork assembly, a cambering frame having a forward support pivotally supporting said steering fork assembly for movement about said steering axis, a rear carriage, forward and rearward pivots supporting said cambering frame for cambering movement about an inclined roll axis extending through said pivots, a pair of laterally spaced road wheels operatively supporting said rear carriage, vehicle engine means for driving said rear wheels and secured to and extending forwardly from said rear carriage to form a forward portion thereof, said cambering frame having a forward portion pivotally supported by said engine through said forward pivot, said cambering frame extending upwardly and rearwardly from said forward pivot over said engine and rear carriage into connection with said rearward pivot, a seat on said cambering frame for supporting the vehicle operator, laterally spaced footrest means secured to said vehicle rear carriage and operatively connected to said cambering frame for corresponding cambering movement therewith for receiving the feet of said operator when seated on said seat to permit said operator to directly impart manual balancing moments to said cambering frame to thereby stabilize vehicle operation.

3. A three-wheel cambering vehicle comprising a front steering fork assembly operatively mounted along the longitudinal axis of the vehicle and rotatable about an inclined steering axis, a steerable front road wheel mounted on the lower extremity of said fork assembly for rotation about an axis transverse to said steering axis, manual steering means fixed to an upper portion of said fork assembly, a cambering main frame having a forward support mounting said steering fork assembly for pivotal movement about said steering axis, a rear frame pivotally supporting said cambering frame for left and right cambering movement about an inclined roll axis coplaner with the longitudinal axis of said vehicle, a pair of laterally spaced road wheels operatively supporting said rear frame, motor means connected to said rear frame for driving said rear wheels, said cambering frame having an extension fixed thereto extending rearwardly over said motor means and rear frame, a seat on said extension for supporting a vehicle operator and laterally spaced footrest means operatively connected to said rear frame for receiving the feet of said operator when seated on said seat to permit said operator to directly use said rear frame as a ground to manually hold said main frame in equilibrium when cambered.

4. The cambering vehicle defined in claim 3 and further comprising an elongated support coupled to said engine and extending transversely to the longitudinal axis of said vehicle, a pair of forwardly extending tubes attached to the outboard ends of said support, each of said tubes having a forward end and linkage means operatively connecting said footrest means at the forward ends of said tubes to said cambering main frame so that said footrest means tilt in accordance with the direction and degree that said main frame is cambered.

5. A three-wheel cambering vehicle comprising a front steering fork assembly operatively mounted along the longitudinal axis of the vehicle and rotatable about an inclined steering axis, a steerable front road wheel mounted on the lower extremity of said fork assembly for rotation about an axis transverse to said steering axis, manual steering means fixed to an upper portion of said fork assembly, a cambering main frame having a forward support mounting said steering fork assembly for pivotal movement about said steering axis, a rear frame having a fixed non-cambering relationship with a support surface pivotally supporting said cambering main frame for left and right cambering movement about an inclined roll axis, a pair of laterally spaced road wheels operatively supporting said rear frame, said cambering frame having an extension fixed thereto extending rearwardly over said rear frame, a seat on said extension for supporting a vehicle operator and laterally spaced footrest means operatively connected to said rear frame for receiving the feet of said operator when seated on said seat to permit said operator to directly physically use said rear frame as a ground and impress balancing loads thereupon to hold said main frame in equilibrium when cambering.

6. A cambering vehicle defined in claim 5 and further comprising an elongated support rigidly fixed with respect to said rear frame and extending transversely to the longitudinal axis of said vehicle, a pair of forwardly extending tubes attached to the outboard ends of said support, each of said tubes having a forward end, and linkage means operatively connecting said footrest means movably mounted at the forward ends of said tubes to said cambering main frame so that said footrest means tilt in accordance with the direction and degree that said main frame is cambered.

7. A three-wheel cambering motorcycle comprising a front steering fork assembly operatively mounted along the longitudinal axis of the vehicle and rotatable about an inclined steering axis, a steerable front road wheel mounted on an axle supported by the lower extremity of said fork assembly, manual steering means fixed to an upper portion of said fork assembly, a cambering main frame having a forward support mounting said steering fork assembly for pivotal movement about said steering axis, a rear frame having a fixed non-cambering relationship with a support surface pivotally supporting said cambering main frame for left and right cambering movement about an inclined roll axis, a pair of laterally spaced road wheels operatively supporting said rear frame, motor means for propelling said motorcycle, said cambering main frame having an extension fixed thereto extending rearwardly over said rear frame, a seat on said extension for supporting a vehicle operator and laterally spaced footrest means operatively supported by said rear frame for receiving the feet of said operator when seated on said seat to permit said operator to physically use said rear frame as a ground to generate stabilizing moments when cambering said main frame.

* * * * *